J. C. BONNER.
TRANSPORTATION SYSTEM.
APPLICATION FILED OCT. 21, 1914.

1,280,140.

Patented Oct. 1, 1918.
9 SHEETS—SHEET 1.

UNITED STATES PATENT OFFICE.

JOSEPH C. BONNER, OF TOLEDO, OHIO.

TRANSPORTATION SYSTEM.

1,280,140.  Specification of Letters Patent.  Patented Oct. 1, 1918.

Application filed October 21, 1914. Serial No. 867,865.

*To all whom it may concern:*

Be it known that I, JOSEPH C. BONNER, a citizen of the United States, residing at Toledo, in the county of Lucas and State of Ohio, have invented certain new and useful Improvements in Transportation Systems, of which the following is a specification.

This invention relates to transportation systems; and it comprises a plurality of vehicles including a road vehicle (which may be power or horse driven) and a road-vehicle-carrier which advantageously is power driven and which preferably is a track vehicle, the road vehicle and the carrier being mutually arranged for association in such manner that the road vehicle is adapted to rest upon and be supported by the carrier with the wheels of the former straddling the latter and parts of the carrier engaging the parts of the road vehicle at points higher than the wheel axes of the latter whereby the center of gravity of the road vehicle is a minimum distance from the wheels of the carrier and whereby the carrier and road vehicle may be quickly and readily assembled or disassembled; and it further comprises the combination of a carrier and a road vehicle, the road vehicle being so dimensioned and shaped that when its wheel treads are on substantially the same ground level with the wheel treads of the carrier the latter may freely enter in the space between the wheels of the road vehicle and below but adjacent to its body, with means carried either by the road vehicle or carrier (advantageously the carrier) for elevating the road vehicle to a slightly higher elevation and for supporting it there; and it further comprises certain details of construction of said carrier and road vehicle and arrangement and combination of parts; all as more fully hereinafter set forth and as claimed.

It is a well recognized fact that in the transportation of freight and heavy goods, the cost very largely resides in the changing from one means of transportation to another. For example, in taking farm products into the city, they are ordinarily carried to the railway in a wagon, transshipped and then on arrival in the city are once more transshipped to a wagon and sent to the place of destination. These two handlings are apt to, and frequently do, cost more than the sheer transportation cost from the point of origin to the point of destination; that is they require more human labor than the transportation proper. To meet this consideration, very many ways have been proposed, but without practical commercial success to the present time. Generally, these propositions involve running the road vehicle or wagon on its own wheels to the top of a freight car or the like where it is chocked in position. During the transportation the road vehicle or wagon rests on its own wheels. Its body is naturally a corresponding distance above the top of the freight car, which, in turn, is above the car axles. In other words, the load is at a high point; the center of gravity is in a relatively elevated position; and the whole load is supported on the freight car at the point of contact of the rims of the road wheels with the top of the car. Obviously, with heavily loaded vehicles, as in transporting stone, iron, and many other things, this renders such a system of transportation practically impossible with railways or trolley lines running cars at a high rate of speed, often on sharp curves. It has therefore not gone into practical use. Sometimes it is proposed to take the body of the road vehicle off the running gear and swing it on the freight car by a crane or the like; but obviously this also requires handling, the only difference being that one large object is handled instead of a plurality of smaller objects. It also necessitates a particular type of road vehicle with loading and unloading stations at specific places. Between such stations it is obviously not possible to transfer such vehicle body to or from the car.

In order to obviate these difficulties I have provided a system of transportation in which, in lieu of employing ordinary cars and ordinary road vehicles I use specific road vehicles and special power driven carriers specially coördinated. The power driven vehicle may be, and advantageously is, one which will run on ordinary railway tracks or trolley tracks and is of standard gage; but I may preserve the advantages of my invention by the use of similar cars run as automobiles. In using the word car or carrier hereinafter I wish to be understood as meaning either a car running on tracks or a power driven vehicle adapted to run on an ordinary roadway. The car may of course be directly or indirectly power driven or actuated; as in using one or more trailer cars behind a locomotive or trolley car. In order to obviate the troubles regarding the center of gravity hereinbefore mentioned and to secure advantages in loading and unloading, I make the road vehicle of a special type, doing away with the cross axle ordinarily used in road vehicles, or using an axle of inverted U-form. Instead of using such an ordinary axle, in one form of my invention, I mount the wheels of the road vehicle on depending members. Laterally adjacent pairs of these depending members are spaced far enough apart to allow the top of the car to enter therebetween and pass freely at a point above the axes of the road wheels; and advantageously at a point nearly adjacent to the bottom of the road vehicle. Advantageously, the two vehicles are so coördinated and arranged that in the normal position of the road vehicle with its wheels resting on a road at about the level of a pair of tracks, the car running on such tracks can pass freely under the body of the road vehicle and between its wheels without obstruction. If desired I may use inclined planes alongside the tracks and a road vehicle which is of wider gage than the carrier, but which need not necessarily have its bottom at a normal level above the carrier floor. In this instance, though in assembled position the points of engagement between the carrier and road vehicle are above the axes of the wheels of the latter. This enables me to load or unload the road vehicle at any point without the use of cranes or hoisting mechanism. Advantageously I locate elevating means between the vehicle and carrier which when placed in operation will raise the body of the road vehicle and its depending wheels to an elevation where such depending wheels will clear the roadway. The breadth of the road vehicle or the space between its depending wheels, should be sufficiently wide to give a good clearance on each side of the car wheels so that there will always be a clearance, even when the car is rounding a curve and its truck wheels are at an angle to the body of the car. Advantageously, this elevating mechanism is pneumatic and is connected to the regular brake system of the car so that the compressed air of the reservoir on the car may be used for elevating and lowering. Where pneumatic means of this type are used, there should be positive means capable of engaging and holding the car in its elevated position independent of the air pressure. By the provision of such positive means, the brake air may be used for placing the road vehicle in transportation position and in loading or unloading position while during transportation the road vehicle may be held in place by the other means. Advantageously, the holding means engage a considerable area of the bottom of the road vehicle. However other elevating and holding means such as cams, toggles, etc., actuated by hand by electric motors etc., may be used. It is advantageous to have the elevating means and the holding means independent since this enables the use of a simpler structure.

A single car may be adapted to transport a plurality of such road vehicles, three or four for example. In such event, the car is ordinarily provided with a motorman's or engineer's cab and observing cabs and the road vehicles are so arranged that when placed in position on the car they make a practically continuous body. A single car carrying or provided with steam or electric motors may be used to actuate a train of road-vehicle carrying cars of the nature of flat cars. But it is ordinarily better to provide each car with its own power plant. Where the road vehicles are horse actuated, the hounds and pole may be so arranged as to fold up or be removable.

Obviously, the described cab-carrying car may be run on ordinary automobile or truck wheels instead of flanged wheels adapted for trolley or railroad tracks.

The carrying vehicle or car may have a flat top adapted for raising and lowering, or it may have a skeleton top, as for instance having two parallel beams with cross pieces thereabove adapted for raising and lowering. Ordinarily these platforms or pairs of cross pieces will be in number as many as the number of vehicles adapted to be carried by such car. Whatever the design of the particular type for the vehicle carrying the car, it should be such as will give a large area contact with the bottom or supporting members of the road vehicle.

In the accompanying illustration I have shown, more or less diagrammatically, certain embodiments of the described invention. In this showing

Fig. 3 is a top plan view of a portion of the power vehicle embodying the particular road vehicle lifting means shown in Fig. 2;

Fig. 5 is a segmental view similar to Fig. 4, showing the lifting mechanism in position preparatory to elevating the road vehicle;

the wheels of the carrier and the road vehicle being on a common level;

Fig. 8 is a detail view, partly in vertical cross section and partly in elevation, of the front of one of the road vehicles with the body removed;

Figure 1:
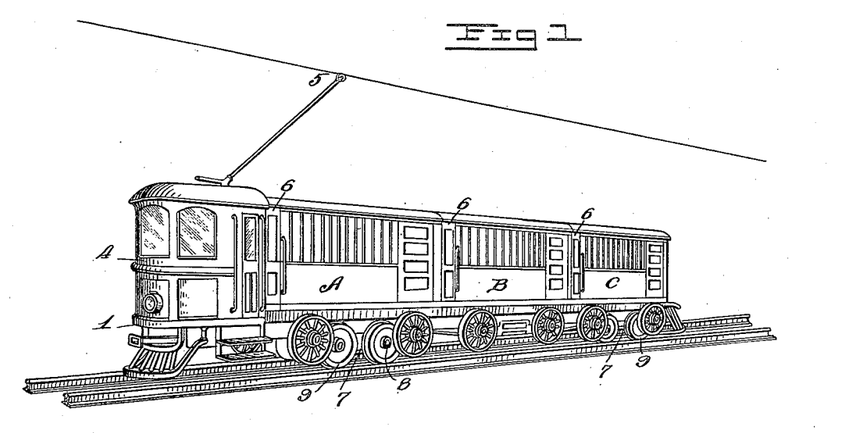
Figure 1 is a perspective view of a complete power actuated vehicle (shown as a trolley car) carrying three road vehicles or wagons in position for transportation to a distant point.

In the showing a power actuated carrier hereinafter referred to as the "car," consists of the usual frame 1, made up of longitudinal beams 2, and transverse stiffening angle-irons 3. The frame of the car may be of any suitable structure resulting in sufficient strength for the purposes in view. According to my invention, the front part of this car frame is provided with a cab 4, having trolley 5, when the car is an electrically operated vehicle. The cab contains controlling mechanism for the motors which propel the car and controlling mechanism for operating the brakes for stopping the car, and, in addition, mechanism for actuating and controlling the lifting, loading and sustaining devices hereinafter more specifically referred to. Road vehicles A, B and C, which may be horse drawn or power driven, are arranged to be mounted upon the car. These vehicles are advantageously identical. Each may be provided with doors 6 which, when the road vehicles are assembled in position on the car, may be shut to make a continuous car-like body on the truck. One of the sets of doors of the forward car may engage the rear of the cab. Preferably the forward end of the vehicles are of less height than the cab in order that the forward end of one vehicle may be nested as is shown in Fig. 1. When flat road vehicles are used this construction is of course dispensed with.

Figure 5:
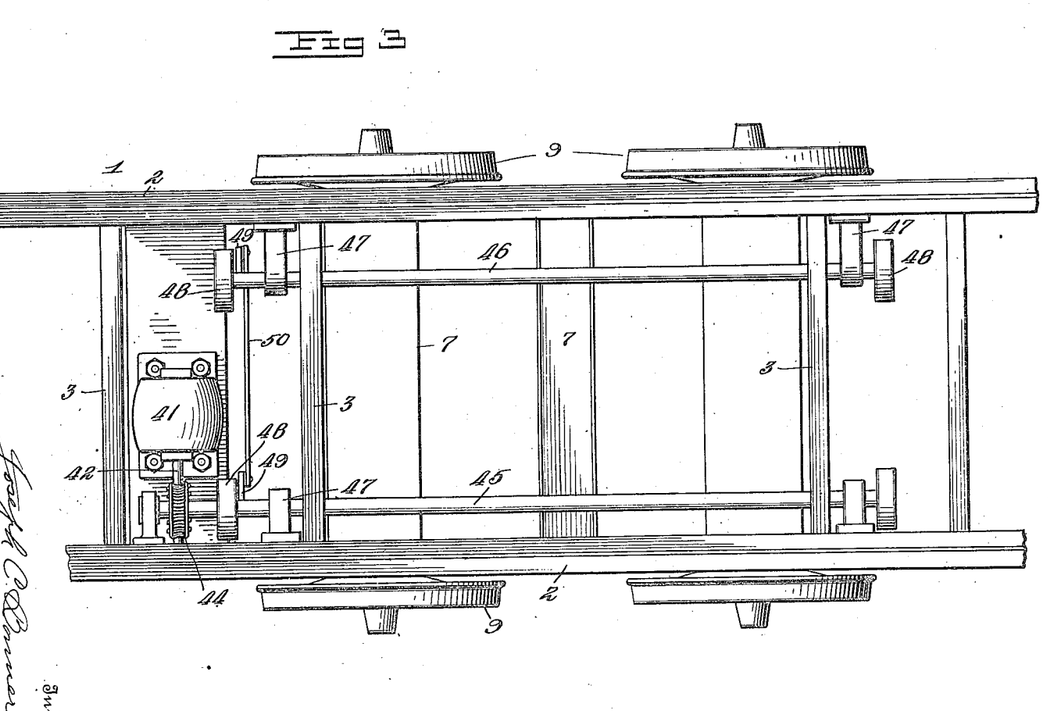

The car is provided with the usual trucks 7 carrying axles 8 and wheels 9, advantageously arranged for running on the standard gage railroad tracks. Each wagon or road vehicle is provided with a floor or body supporting member 10 and lateral depending members 11 in which are journaled road wheels 12 a greater lateral distance apart than the track wheels 9 of the car. The wheels 12 of the road vehicle and the depending members 11 are of such combined height as to maintain the floor of the road vehicle normally above the level of the frame of the car, whereby the road vehicle may completely straddle the car when the treads of both of the vehicles are on substantially the same level (see Fig. 5); and the axes of the vehicle wheels are below the floor of the car.

Figure 6A:
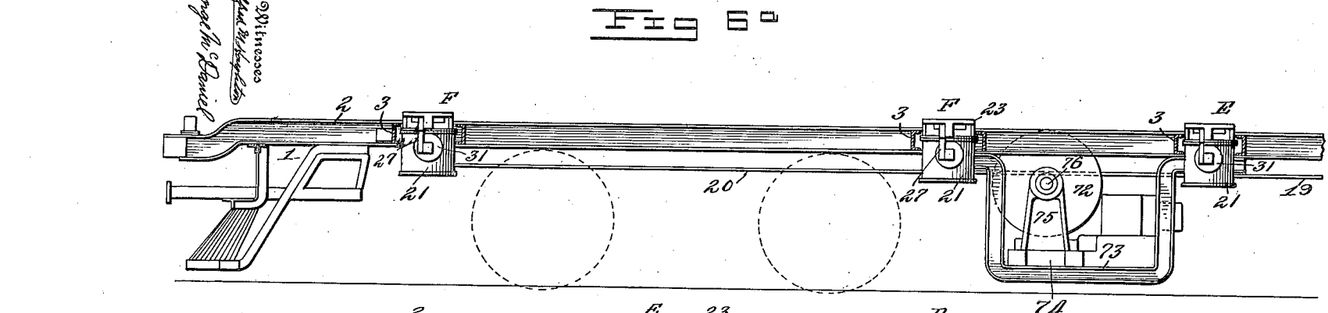
Figs. 6ª, 6ᵇ and 6ᶜ, taken together, are a side elevation, partly in section, of the carrier the view having been made in three parts for the sake of clarity.
Figure 6B:
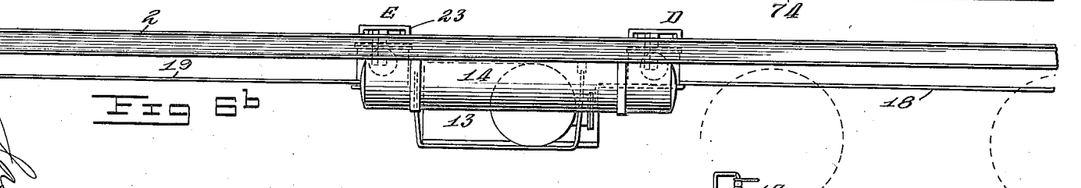
Figure 6C:
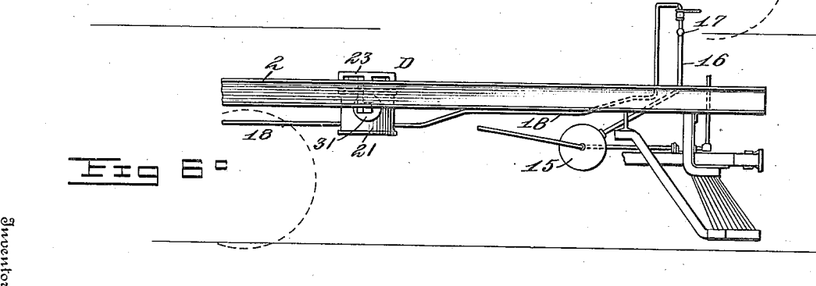
Figure 7:
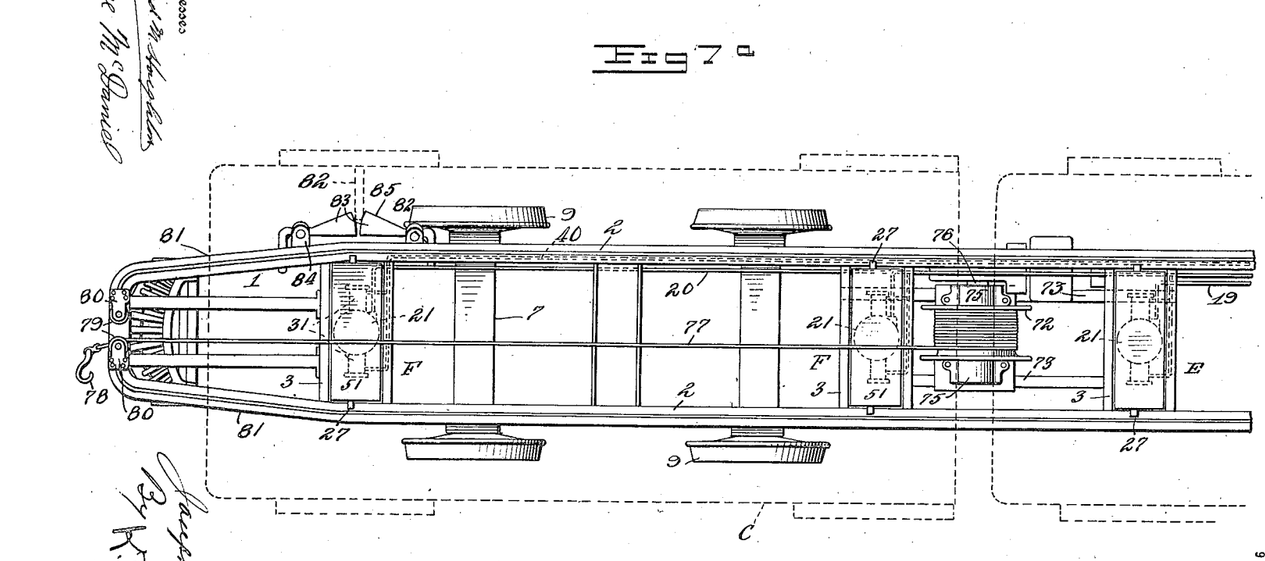
Figs. 7ª, 7ᵇ and 7ᶜ, taken together, show in plan view the entire length of the carrier of Fig. 1, certain details of the usual braking mechanism being omitted and the outlines of the road vehicle being shown in dotted lines.
Figure 7B:
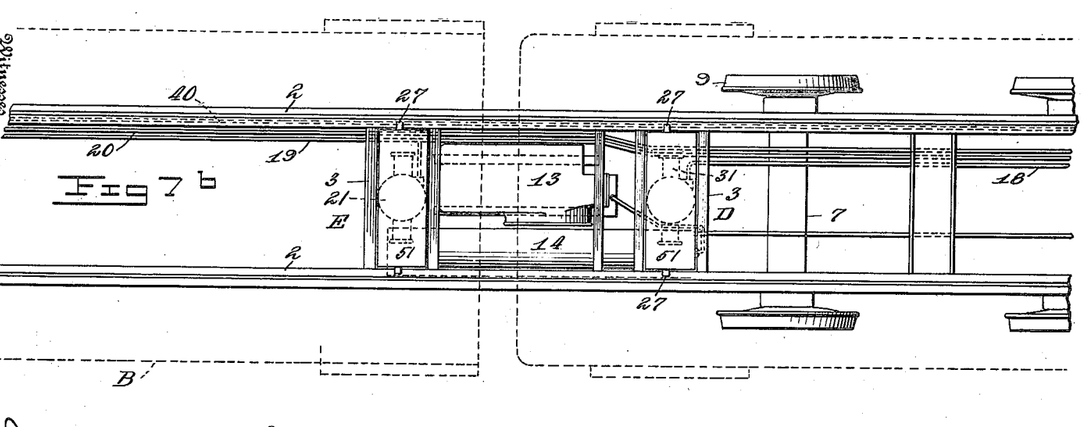
Figure 7C:
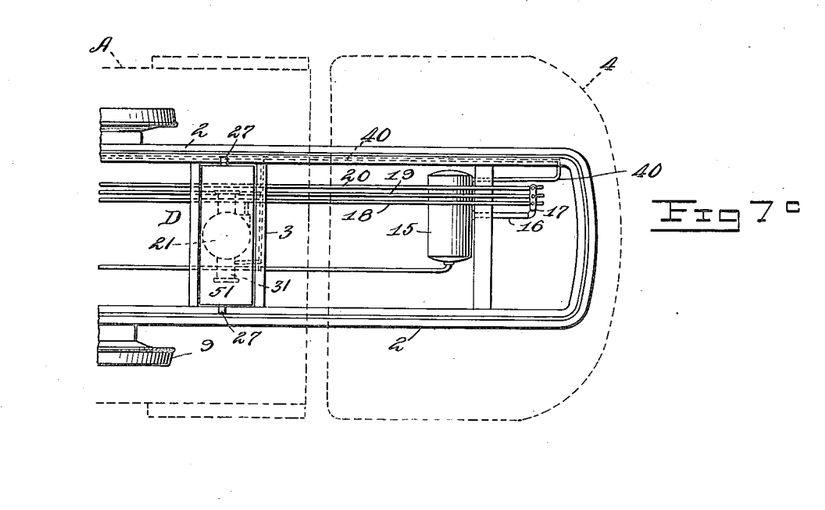

It is not necessary to give a detailed description of the car with reference to the usual construction which may be employed in connection with my invention. The frame may be made in any suitable form and the car may be equipped with the usual air brake mechanism controlled from the car. One form of lifting and sustaining device or device for increasing distance between the car and vehicle described hereinafter for the sake of exposition of my invention is combined with the usual air brake mechanism and therefore I have shown, more or less diagrammatically, certain details of this mechanism. Referring particularly to Figs. 6ª, 6ᵇ and 6ᶜ, and 7ª, 7ᵇ and 7ᶜ, 13 is a compressor which automatically operates to force air under predetermined pressure into main tank 14 in the usual way. This main tank is in valved pipe connection with auxiliary tank 15 which is used for storing air employed in the pneumatic lifting device hereinafter described. From auxiliary tank 15, pipe 16 leads to a manifold 17 and from the manifold (17) valved pipes 18, 19 and 20 lead to three sets of pneumatic lifting devices, D, E and F, respectively. Each set of pneumatic lifting means consists in lifting mechanism comprising two members spaced longitudinally of the car a sufficient distance to engage extremities of the floor of each road vehicle when the road vehicles are in position over the car for elevation. In other words, the lifting means D, D comprise one set which serves to lift one car by engagement with the floor at either end. E, E constitutes another set and F, F constitutes a third set. As many sets of these lifting means may be employed as there are road vehicles to be transported. Ordinarily, I have found that three such sets on each car frame suffice admirably for the purpose in view. The pipe 16 leading from the auxiliary tank to the manifold may be controlled by a valve operable from the cab of the car and each of the pipes 18, 19 and 20 may be separately operated by valve mechanism in the cab. If desired, an additional valve may be located in the manifold 17. These valves are not described in detail as they may consist in the usual form of valves used in air brake systems and the like; they may be 3-way valves which when operated in one position allow the air in the respective pipes to exhaust to the atmosphere, when operated in another position cause the air to flow from the tank through the pipes to particular lifting mechanism, and which when operated in the third position shut off communication between the tank and the lifting means.

The lifting devices are arranged in sets and the members of each set are identical; a description of one set will suffice. Each lifting device comprises a cylinder 21 mounted in the frame of the car between the side beams. In this cylinder a piston 22 (shown in dotted lines in Fig. 5) operates to lift a platform 23. The piston is connected to the piston rod 24 terminating in a head 25 of substantial area, located in a housing 26. The platform 23 advantageously extends substantially transversely across the car frame, and advantageously is of a length corresponding at least substantially to the diameter of the piston head 25. It may however constitute a solid or skeleton floor of the car frame and such platform may be elevated at both ends by the corresponding lifting devices.

When the pneumatic lifting devices are employed to elevate a road vehicle to position for transportation upon the car it is advantageous to employ positive sustaining means arranged to sustain the load of the road vehicle independent of the lifting means. One form for accomplishing this is a set of positively acting sustaining members which may be arranged in combination with the lifting device to automatically move into load-sustaining position when the lifting device has elevated the road vehicle a predetermined distance. In the form shown in Figs. 4 and 5, these load-sustaining members are heavy dogs 27, each of which is provided with a slot 28 connected by means of a pivot 29 to piston rod 30. The piston operates in cylinder 31 auxiliary to the main cylinder 21, but may be independent, if desired. Each dog is pivoted at its upper end by means of pivot 32 to the under side of the platform and has an inwardly extending spring supporting shelf 33. Between the shelf and the under side of the platform, preferably in spring-housing 34, a coiled spring 35 is located, such spring having a tendency to force the shelves 33 downwardly and thus the dogs into substantially vertical position. Each dog is further provided with an extension 36 which is in juxtaposition to the longitudinal beams on each side of the car. When the pneumatic lifting device has elevated a vehicle to such a height that this extension 36 passes above the I-beams, the air may be released from the cylinder 21 and the weight of the vehicle may be sustained by the dogs. The extensions 36 are provided with beveled faces 37 in order that they may slide past the under edges of the beams and with straight surfaces 38 so that they may sufficiently engage the top of the beams to sustain the load. The air is released from cylinder 21 by means of one of the valves referred to.

It being desired to lower a road wagon from the sustained position, compressed air is admitted to cylinder 21 and the wagon is lifted a short distance; air is admitted to cylinders 31 and forces pistons 39 inwardly to disengage the extensions 36 from the top of the beams. This air is admitted to the cylinders 31 by means of valve controlled pipe 40, shown in dotted lines in Figs. 7ª, 7ᵇ and 7ᶜ and in Fig. 4. I have shown only one of these pipes connected to all the cylinders 31, and when the several wagons are to be lowered simultaneously this is the simplest and most advantageous arrangement; but I may provide a separate pipe for each set of cylinders 31 having independent controlling means.

Figure 2:
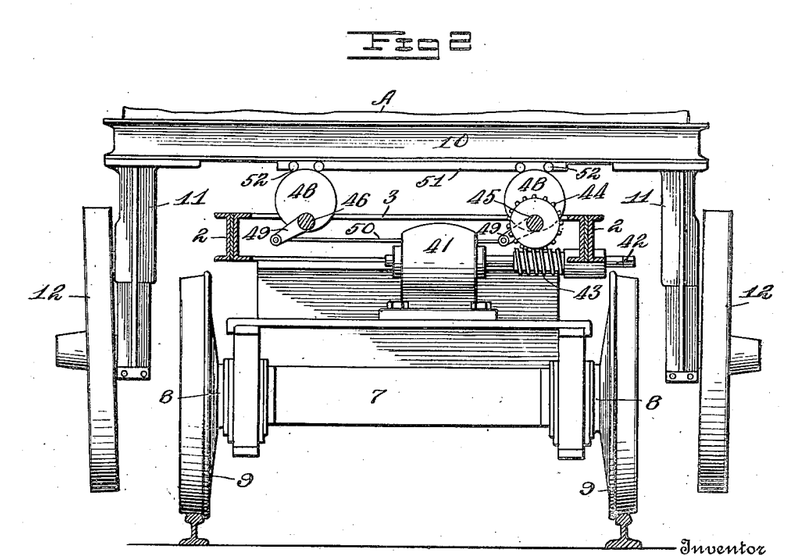
Fig. 2 is a detail view in vertical cross section, partly in elevation, of certain means for hoisting the road vehicle into position for transportation and shows the road vehicle in elevated position.

The means for elevating, sustaining and lowering the road vehicle above described are advantageous in use with cars having air brake systems. It is desirable however at times to provide other means for accomplishing the same purpose and I have therefore shown, more or less diagrammatically, a different set of apparatus operable from the car. Referring particularly to Figs. 2 and 3, motor 41, operated from the car in any well understood way, carries shaft 42, which may be directly connected to the armature, and a worm 43 on the shaft. This worm meshes with worm-gear 44, carried by a shaft 45. Shafts 45 and 46 are supported longitudinally of the car by means of hangers or brackets 47 suitably connected to the longitudinal beams. Each one of these shafts carries cams 48 toward its ends. When the righthand shaft 45 is rotated through the motor, worm and gear, the lefthand shaft 46 is simultaneously rotated through the cranks 49 connected to the cams and links 50 connecting these cranks. I have shown one set of such mechanism for each road vehicle to be elevated. The floors 10 of the road vehicles may carry suitable means 51 on the under sides containing roll bearings 52. The cams 48 engage these roll bearings and when such cams are rotated by means of the motor, they elevate or lower the road vehicle, as the case may be. Referring to Fig. 3, there are four cams operated by one motor for each road vehicle. It is obvious that different modifications of this mechanism may be made without departing from the spirit of this invention. The motors may be controlled from the cab of the car and may be operated in the usual manner. The details of the controlling mechanism and motors do not form the subject matter of this invention and therefore it is unnecessary to describe them at length.

Figures 9, 10:
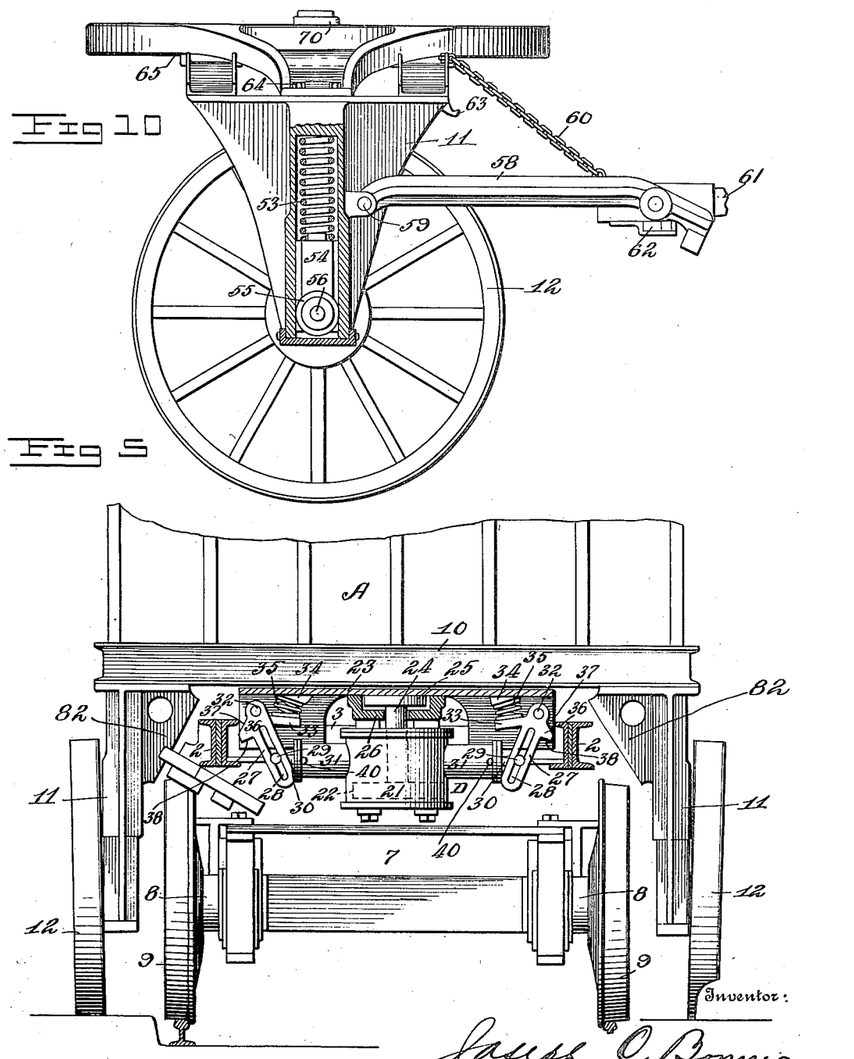
Fig. 9 is a top plan view of Fig. 8.
Fig. 10 is a side elevation of Fig. 8.
Figure 9:
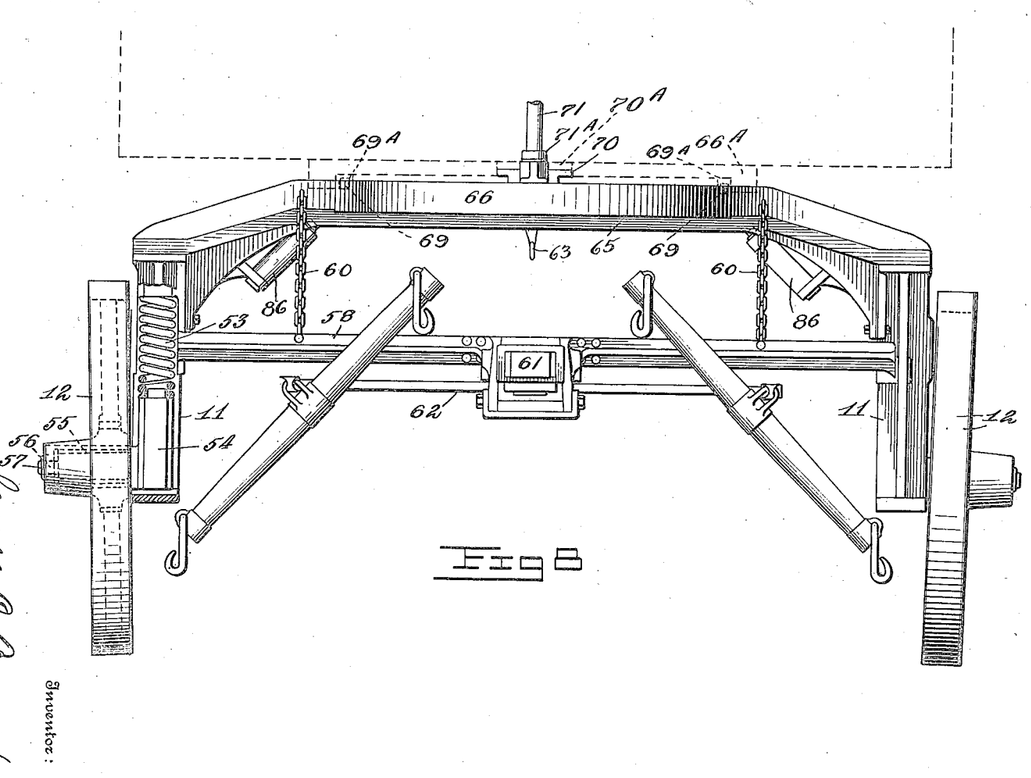

The road vehicle is of a special type and forms an important feature of my invention. One specific form is shown in Figs. 8, 9 and 10. Depending members 11 are securely attached to the floor 10 of the wagon.

These members form suitable housings for springs 53 which operate as shock absorbers for sliding blocks 54 located in the housing. Wheels 12 are journaled to these blocks by means of hubs 55, stud pins 56 and nuts 57. Through this arrangement the floor of the road vehicle is maintained normally at a higher level than the floor of the frame when the treads of the wheels of both vehicles are at a common level and the axes of the wheels are below the floor of the car and the lifting and sustaining means. The depending members 11 are separated a greater distance than the greatest width of the car and therefore the road vehicle may completely straddle the car. This road vehicle may be power driven, if desired. I have shown it as a horse draft vehicle provided with steering means. Hounds 58 are pivoted at 59 to the depending members 11 and are provided with a set of chains 60 to maintain them in drafting position. They may be elevated to approximately the floor of the vehicle when the vehicle is to be loaded on the car. The hounds carry the usual tongue 61 and whiffle-trees 62. This tongue is advantageously removable and may be used as a lever to lift the hounds when they are situated so that they cannot be lifted by hand. Catches 63 are provided on the forward end of the wagon for holding the hounds in elevated position. The fifth wheel of the road vehicle is different from the usual fifth wheel in horse drawn wagons.

The front wheels of the wagon, together with the depending members, are attached by bolts 64 to a fifth wheel platform member 65, the whole constituting a front truck. Any type of fifth wheel construction may be used, it being only necessary that the wider gage vehicle be adapted for guiding into position, and for independent travel on roads. In other words, the road vehicle is provided with a running gear. This platform member has an annular track 66 and an internal rack 67. Brace 68 carries a runway 69 for ball bearings and housing 70 for the king bolt. The bottom of the wagon (Fig. 8) is provided with an annulus 66$^A$ which corresponds to the track 66. It further carries ball bearing runway 69$^A$ which, together with the runway 69, houses suitable ball bearings, and it also is provided with the housing 70$^A$ for the king bolt. Attached to the wagon is a steering post 71 terminating in proximity to the driver's seat, in a steering wheel (not shown) and carrying at its other end a pinion 67$^A$ meshing with the rack 67. Revolution of the steering gear will revolve this pinion and turn the fifth wheel and forward truck, as is well understood. The steering post may be suitably secured to the body of the wagon by brackets 71$^A$, as is shown in Fig. 9. This steering mechanism is useful when it is desired to load the wagons on the cars when the wagons have been left alongside the railroad track and the horses have been unhitched. Any form of steering mechanism may be used in place of the one I have shown and any applicable type of fifth wheel may be adopted. It is only necessary that the front wheels may be turned and that mechanism for accomplishing this shall be located in a plane above the axes of the wheels in order that the wagon may straddle the car. The showing in respect to this fifth wheel mechanism, steering mechanism and wheel attachment is more or less diagrammatic, as illustrative of certain forms which may be availed of.

The present transportation system permits the possibility of quick and ready loading of the road vehicles upon the cars. The road vehicles may be drawn to points alongside the tracks, preferably where the road and track levels are substantially in the same plane. The wagons may be left alongside the tracks and the horses may be unhitched to be used for drawing other vehicles to the point from which they are to be transported. In order that the wagons left alongside the railroad tracks may be loaded upon the cars, I provide loading mechanism advantageously operable from the cars and controllable from the cab by the engineer. This loading mechanism comprises power means operated by motors on the car and connections controlled by it which may be attached to the road vehicles to draw them into position in alinement with the cars. The loading mechanism which I have shown for the sake of exposition of my invention comprises an electrically controlled drum 72 (Figs. 6$^a$ and 7$^a$). This drum is supported by the framework of the car on hangers 73, base 74, standards 75 and shaft 76. These may be of any type applicable for the purposes in view. Cable 77 is secured at one end to the drum and terminates at the other end in hook 78. This cable passes between pulleys 79 revolubly secured to the rear end of the car frame by brackets 80. The rear end of the car frame is preferably tapered as indicated by reference numeral 81, to assist in guiding the road vehicle into longitudinal alinement with the car. Advantageously, this hook is provided with means of greater dimension than the space between the guiding pulleys in order that it may be normally maintained in position between these pulleys. Each road vehicle has attached to it at a plurality of points eyes or other members to which the hook 78 may be attached. When it is desired to load a road vehicle upon the car, the drum is released, the cable is carried to the vehicle to be loaded and the hook of such cable is inserted in the eye on the car which is in the best position to assist in guiding the vehicle into longitudinal alinement with the car.

Figure 4:
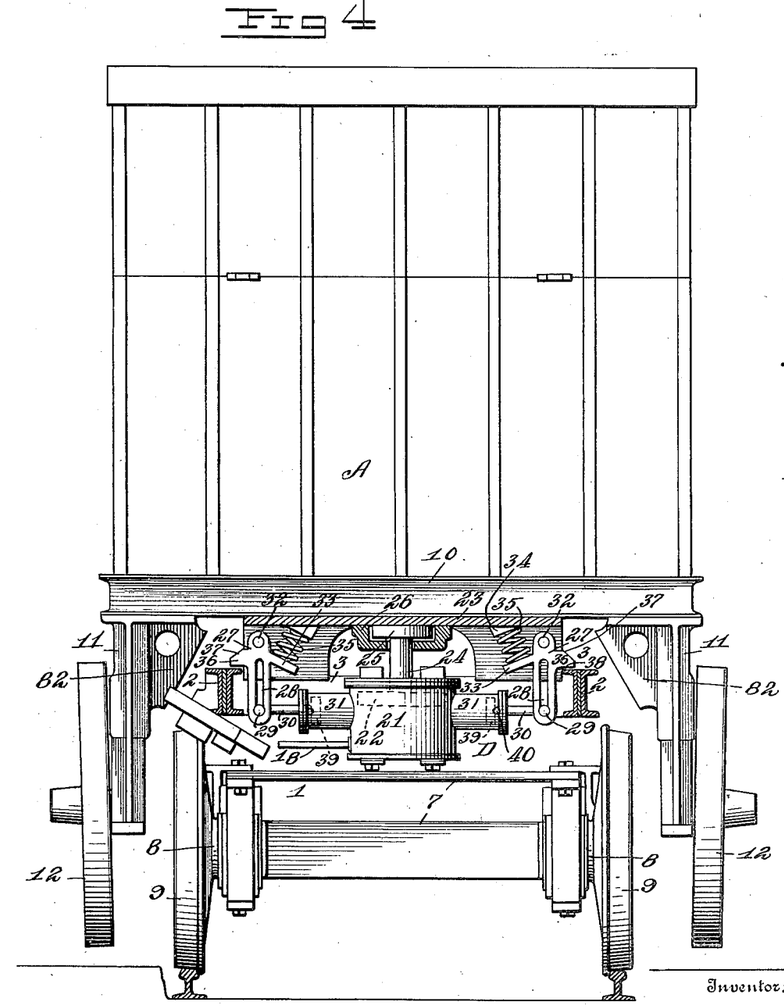
Fig. 4 is a view, partly in elevation and partly in vertical cross section, of the carrier and the road vehicle assembled ready for transportation with the details of certain lifting mechanism, other than shown in Figs. 2 and 3, therebetween.

The drum is then reversed and the vehicle is drawn by means of the cable into alinement with the car. If desired the vehicle may be steered by means of the steering mechanism referred to. In the form of loading mechanism I have here illustrated the road vehicle may be drawn either completely on the car or may be left at the rear of the car in proper alinement. When it is to be drawn completely on the car the hook 78 must be arranged so that it may pass the pulleys 79. When such form of the loading device is used it is advantageous to employ automatic drum braking or stopping mechanism. This may be accomplished by providing each road vehicle, and advantageously its forward truck, with lateral members 82 which are arranged to coöperate with wings 83 pivoted in brackets 84 on one longitudinal beam of the car. Each of these wings is provided with a cam surface 85 which engages the edge of member 82 and is moved accordingly. Electric contacts, either breaking or making a circuit including controlling or braking mechanism for the drum, may be arranged to be operated by these wing members. They are normally spring-pressed outwardly and in such position that in pairs they present a space between opposing edges into which the edge of member 82 may seat. This engagement of member 82 with the wings 83 prevents longitudinal movement of the road vehicle with respect to the car after it is loaded. Members 82 are preferably tapered in order that they may ride vertically between the wings 83. The members 82 may be arranged on the rear of the road vehicle as is shown in Fig. 4. Each road vehicle may be provided with inclined roll bearings 86 to facilitate loading.

Some of the illustrations accompanying this application are more or less diagrammatic, for clarity of presentation. Necessarily several old mechanical elements have been combined in some instances. Of course the equivalents of these may be availed of and other changes may be resorted to without departing from the spirit or scope of my invention and except as hereinafter specifically claimed the invention is not to be limited to such details.

What I claim is:—

1. Transportation means comprising two complementary vehicles, one of narrower gage than the other, the vehicle of wider gage resting upon the vehicle of narrower gage with the axes of the wheels of the wider vehicle at points below the horizontal plane of engagement of the two vehicles, and the axes of the wheels of the wider vehicle being above the axes of the wheels of the narrower vehicle when both vehicles are on the same ground level.

2. Transportation means comprising two complimentary vehicles one of narrower gage than the other, the vehicle of wider gage being supported from the top of the gage of narrower gage, with the axes of its wheels at points lower than the points of support, and the axes of the wheels of the wider vehicle being above the axes of the wheels of the narrower vehicle when both vehicles are on the same ground level.

3. Transportation means comprising two complementary vehicles one of narrower gage than the other, the vehicle of narrower gage having means for supporting the vehicle of wider gage, the vehicle of wider gage when in position on the vehicle of narrower gage having the axes of its wheels depending substantially below the said means, and the axes of the wheels of the wider vehicle being above the axes of the wheels of the narrower vehicle when both vehicles are on the same ground level.

4. Transportation means comprising two complementary vehicles, one of narrower gage than the other, means on one of the vehicles for lifting the vehicle of wider gage to a point where its wheel treads are above the level of the wheel treads of the other vehicle and means for supporting such wider gage vehicle with the axes of its wheels below the lifting means, the axes of the wheels of the wider vehicle being above the axes of the wheels of the narrower vehicle when both vehicles are on the same parallel.

5. Transportation means comprising two complementary vehicles, one of wider gage than the other, the vehicle of wider gage being provided with depending wheel supports, means on the other vehicle for lifting the vehicle of wider gage to a point where its wheel treads are above the wheel treads of the other and means for holding the wider gage vehicle in the position to which it is lifted.

6. Transportation means comprising two complementary vehicles one of narrower gage than the other, the vehicle of narrower gage being arranged with track wheels and the other vehicle being provided with road wheels, the axes of the wheels of the wider vehicle being above the axes of the wheels of the narrower vehicle when both vehicles are on the same ground level, means to seat the vehicle of wider gage on the vehicle of narrower gage with the wheels of the former depending to a point near but above the tread of the wheels of the latter with the axes of the wheels of the wider vehicle below the longitudinal plane of engagement.

7. Transportation means comprising a car and a road vehicle of wider gage, said road vehicle provided with a running gear having a recess extending from end to end and above the axes of its wheels, said recess being wide enough to accommodate the said car, and means for maintaining the road vehicle in superimposed position with respect to the car with the axes of its wheels below the points of engagement of the two vehicles, the axes of the wheels of the wider vehicle being above the axes of the wheels of the narrower vehicle when both vehicles are on the same ground level.

8. Transportation means comprising a car and a road vehicle of wider gage, said road vehicle provided with a running gear having a recess extending from end to end and above the axes of its wheels, said recess being wide enough and high enough to accommodate said car in the normal or road position of such vehicle, and means for maintaining the road vehicle in superimposed position with respect to the car with the axes of its wheels below the points of engagement of the two vehicles, the axes of the wheels of the wider vehicle being above the axes of the wheels of the narrower vehicle when both vehicles are on the same ground level.

9. In a transportation system, a road vehicle of wide gage having a body, wheel-carrying depending members with a clearance therebetween extending from end to end and to a level higher than the axes of the wheels and automatic means adapted to engage and to support said vehicle from a flat car located within said clearance.

10. In a transportation system, a power driven vehicle provided with a pneumatic braking system, a road vehicle adapted to ride astride of said power driven vehicle with its wheels on substantially the same level as the wheels of said power driven vehicle, and intermediate pneumatic means connected to said braking system for raising said road vehicle to a higher elevation.

11. In a transportation system, a power driven vehicle provided with a pneumatic braking system, a road vehicle adapted to ride astride of said power driven vehicle with its wheels on substantially the same level as the wheels of said power driven vehicle, intermediate pneumatic means connected to said braking means for raising said road vehicle to a higher elevation and means for securing said road vehicle in such higher position.

12. In a transportation system, a road vehicle, a track vehicle straddled by said road vehicle and having a pneumatic braking system, platform means on the top of said track vehicle engaging said road vehicle and pneumatic means for elevating and lowering such platform means connected to said braking system.

13. A freight-carrying device comprising a trolley flat-car having a cab rising above its top and a plurality of road vehicles having bodies adapted to be mounted on said top behind said cab and behind each other, said road vehicles being provided with road wheels mounted on depending members at a sufficient distance apart to afford lateral clearance in any position of the car wheels.

14. A power actuated vehicle having a skeleton top, wagon-supporting means on said top, and a road vehicle supported thereby, means for elevating such supporting means and additional means for securing such supporting means in the elevated position.

15. A power actuated vehicle having a pneumatic braking system and having a skeleton top, wagon-supporting means on said top and a road vehicle supported thereby, pneumatic means for elevating such supporting means and means for securing such supporting means in the elevated position connected to such system.

16. In a transportation system, a power actuated flat car carrying a cab at one end and a plurality of road vehicles having their wheels on depending members with a sufficient clearance therebetween to accommodate the top of such car, the ends of tl bodies of such road vehicles being adapte.. to coöperate with the back of the cab and with each other to make a continuous car structure with said road vehicles in position atop of said flat car, and means for holding such vehicle bodies in such position with their wheel rims at a point above the lower wheel rims of such car.

17. In combination, a flat car and a wheeled road vehicle of wider gage and having its running gear recessed to a point well above the axes of its wheels to accommodate the top of said flat car and means for securing the two vehicles together with said top in said recess.

18. In a transportation system the combination of a carried vehicle having a space between its wheels and extending above the axes, a carrier vehicle adapted to move freely through such space in the normal or road running position of said carried vehicle, means on the carrier vehicle to engage and elevate the carried vehicle and additional means for securing the carried vehicle in its elevated position.

19. In a transportation system the combination of two vehicles, one such vehicle having its running gear provided with a clear space between its wheels extending above the axes and the other vehicle being adapted to pass freely into such space, with means for securing the two vehicles together in superimposed position and additional means for changing the elevation of one such vehicle relative to the other.

20. In a transportation system the combination of two vehicles being arranged for travel on roads and one such vehicle having its running gear provided with a clear space between its wheels extending above the axes and the other vehicle being adapted to pass freely into such space, with means for securing the two vehicles together in superimposed position with the said axes at a lower level than said means and means for changing the elevation of one such vehicle relative to the other, the axes of the wheels of the wider vehicle being above the axes of the wheels of the narrower vehicle when both vehicles are on the same ground level.

21. In a transportation system, a flat car having a cab arising above its top, tracks for supporting such car, a plurality of wheeled road vehicles, each of said road vehicles having its wheels supported on lateral depending members, the space between such lateral depending members being sufficient to allow the top of the car to extend upwardly therebetween to a point adjacent the body of the vehicle and means between the top of the car and the body of the vehicle for increasing such distance sufficiently to lift the bottom of the wheels of the vehicle to a point above the bottom of the wheels of the car, and means for supporting said road vehicle in raised position.

22. In transportation apparatus, a railroad car, a road vehicle having a vehicle body, depending members on said body, road wheels mounted in said members, the bottom of the road vehicle and the top of the car being so shaped and dimensioned as to permit said top to enter between said members, adjustable lifting members positioned between and capable of engaging the bottom of said body and the top of said car, and automatically operated sustaining means for holding the road vehicle in elevated position.

23. In combination, a car having wheels, a vehicle, depending members mounted on such vehicle and carrying road wheels, the axes of the wheels of said wider vehicle being above the axes of the wheels of the narrower vehicle when both vehicles are on the same ground level, such vehicle and such car being so shaped and dimensioned that with the wheels at the same lower rim level the top of said car can pass freely between said depending members into proximity to but clear of the bottom of said vehicle.

24. In a transportation system the combination of two vehicles, one such vehicle provided with a running gear having a clear space between its wheels extending above the axes and the other vehicle being adapted to pass freely into such space, lifting means for elevating the second vehicle, and means for securing the two vehicles together in superimposed position.

25. The combination with a structure as described in claim 1, of means on one of the vehicles independent of the wheel propelling means for moving the vehicles longitudinally with respect to each other whereby the wider vehicle may be adjusted to position upon the narrower one.

26. The combination with a structure as described in claim 1, of means on one of the vehicles independent of the wheel propelling means for moving the vehicles longitudinally with respect to each other, said means comprising a drum mounted on one vehicle, a flexible connection controlled by said drum and means for rotating said drum.

27. The combination with a structure as described in claim 1, of means on one of the vehicles independent of the wheel propelling means for moving the vehicles longitudinally with respect to each other, said means comprising a drum, a flexible connection controlled by said drum, means for rotating said drum and means on one of the vehicles for leaving the vehicle of wider gage to a point where its wheel treads are above the wheel treads of the narrower gage vehicle.

28. Transportation means comprising two complementary vehicles one resting upon and supported by the other, the supporting vehicle having rotatable trucks with wheels thereon and the supported vehicle having wheels depending below the point of engagement of the two vehicles and outside of the wheels of said truck such a distance as to allow free turning of said truck.

29. Transportation means comprising two complementary vehicles one resting upon and supported by the other, the supporting vehicle having rotatable trucks with wheels thereon and the supported vehicle having wheels depending below the point of engagement of the two vehicles and spaced laterally a greater distance than the width of said truck and its wheels whereby the said truck may turn freely within the space between the wheels of the supported vehicle.

In testimony whereof I affix my signature in the presence of two subscribing witnesses.

JOSEPH C. BONNER. [L. S.]

Witnesses:
 JULIA DOWLING,
 DELLA L. BREMER.